United States Patent [19]
Matsuda

[11] Patent Number: 6,014,470
[45] Date of Patent: Jan. 11, 2000

[54] IMAGE READING APPARATUS HAVING A FUNCTION FOR RECTIFYING AN IMAGE DISTORTION CAUSED BY A CURVATURE OF A DOCUMENT SURFACE AND A METHOD FOR EXECUTING THE SAME

[75] Inventor: Shinya Matsuda, Kyoto, Japan

[73] Assignee: Minolta Co., Ltd., Osaka, Japan

[21] Appl. No.: 08/882,110

[22] Filed: Jun. 25, 1997

[30] Foreign Application Priority Data

Jun. 26, 1996 [JP] Japan ................................. 8-165710

[51] Int. Cl.[7] ........................................ G06K 9/40
[52] U.S. Cl. ...................... 382/275; 358/474; 358/493; 399/362
[58] Field of Search ................................ 358/455, 456, 358/457, 474, 493; 382/254, 275; 355/25; 399/362

[56] References Cited

U.S. PATENT DOCUMENTS

| | | | |
|---|---|---|---|
| 5,084,611 | 1/1992 | Okisu et al. | 250/208 |
| 5,416,609 | 5/1995 | Matsuda et al. | 358/474 |
| 5,585,926 | 12/1996 | Fujii et al. | 358/471 |

*Primary Examiner*—Thomas D. Lee
*Attorney, Agent, or Firm*—McDermott, Will & Emery

[57] ABSTRACT

An image reading apparatus having a function for rectifying an image distortion caused by a curvature of a document surface, wherein the image distortion is rectified by duplicating image data that is a line of pixels in accordance with a varied amount of heights of a document surface, and a data conversion that is a image processing procedure in which the number of bits for pixels is reduced, is executed for the rectified image data. Data conversion elements whose number is the same as the maximum duplicated number "N", are arranged in a data conversion device, and the image data of a line to be duplicated are input to the data conversion elements whose number is the same as duplicated number "n" of the line ($n \leq N$), and then, n-line image data which is processed in n data conversion elements, are stored in a memory. Thereby, reducing a memory capacity needed for the distortion rectification can be achieved without lowering picture quality.

15 Claims, 8 Drawing Sheets

SUB-SCANNING DIRECTION

FIG. 3 (b)

MAIN-SCANNING DIRECTION

IMAGE READING APPARATUS HAVING A FUNCTION FOR RECTIFYING AN IMAGE DISTORTION CAUSED BY A CURVATURE OF A DOCUMENT SURFACE AND A METHOD FOR EXECUTING THE SAME

BACKGROUND OF THE INVENTION

This invention relates to an image reading apparatus for reading out a document such as a book or a magazine, and a method for processing read out image data thereof.

Conventionally, an image reading apparatus known as a book scanner is provided. In such an apparatus, a pickup unit is arranged above a document table, and an opened space whose height is several dozen centimeters, exists between the document table and the pickup unit. When reading out bound documents such as a book or a magazine (hereinafter referred to as "bookform document"), a user places a bookform document which is opened with face up on the document table. Scanning for a document surface (a surface to be read out) is started in response to that a start key is ON, and a read out image is output to an external device one by one simultaneously with the scanning. If the external device is a printer, a copied image is provided in real time.

In the above-mentioned book scanner, the user can turn pages on the document table, so it is possible to raise efficiency for reading out many pages. Moreover, compared with a case in which a document is placed face down, damage to the document is far more reduced. Besides, the bookform documents also include filed documents.

Figure 8:
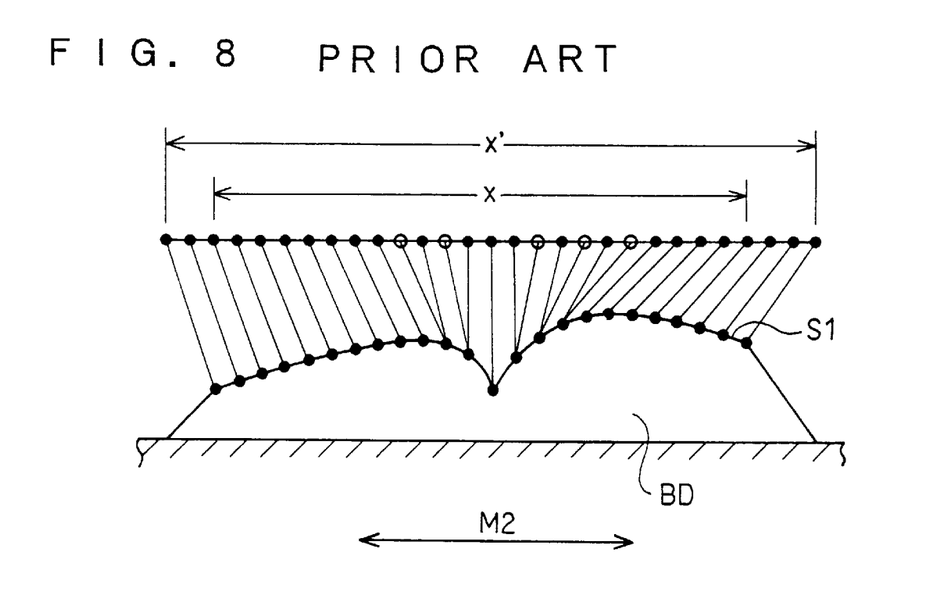
FIG. 8 is a principle view of rectifying distortion.

Unlike a sheet-form document, a document surface of the bookform document is curved. Therefore, a distortion is caused in a read out image according to the curvature condition. The distortion is rectified, and an image having an equal picture quality to that in case of reading out a sheet form document, is output to the external device. As shown in FIG. 8, the distortion rectification is a variable magnification procedure in which each line (a group of pixels which line up in a perpendicular direction to the direction M2 in which the document is opened) of the read out image is duplicated in accordance with a varied amount of the document height (an inclination) of the document surface S1. By means of the distortion rectification, a length x of the read out image in the direction M2 is elongated into a length x' that is a length when the document surface S1 is supposed to be plane. As for a method of detecting changes of document height in the document surface S1, there are a method of executing an image analysis by photographing an upper end surface (so-called "head" in books) of a document (refer to Japanese Patent Unexamined Publication No. 5-161002), and a slit light projection optical method which is employed for a three-dimensional measuring (refer to Japanese Patent Unexamined Publication No. 5-219323).

The book scanner is constructed so as to execute binarization for a readout image whose distortion is rectified as mentioned above by a method of reproducing medium gradations, such as dither method, and output the binarized image to an external device.

Figure 9:
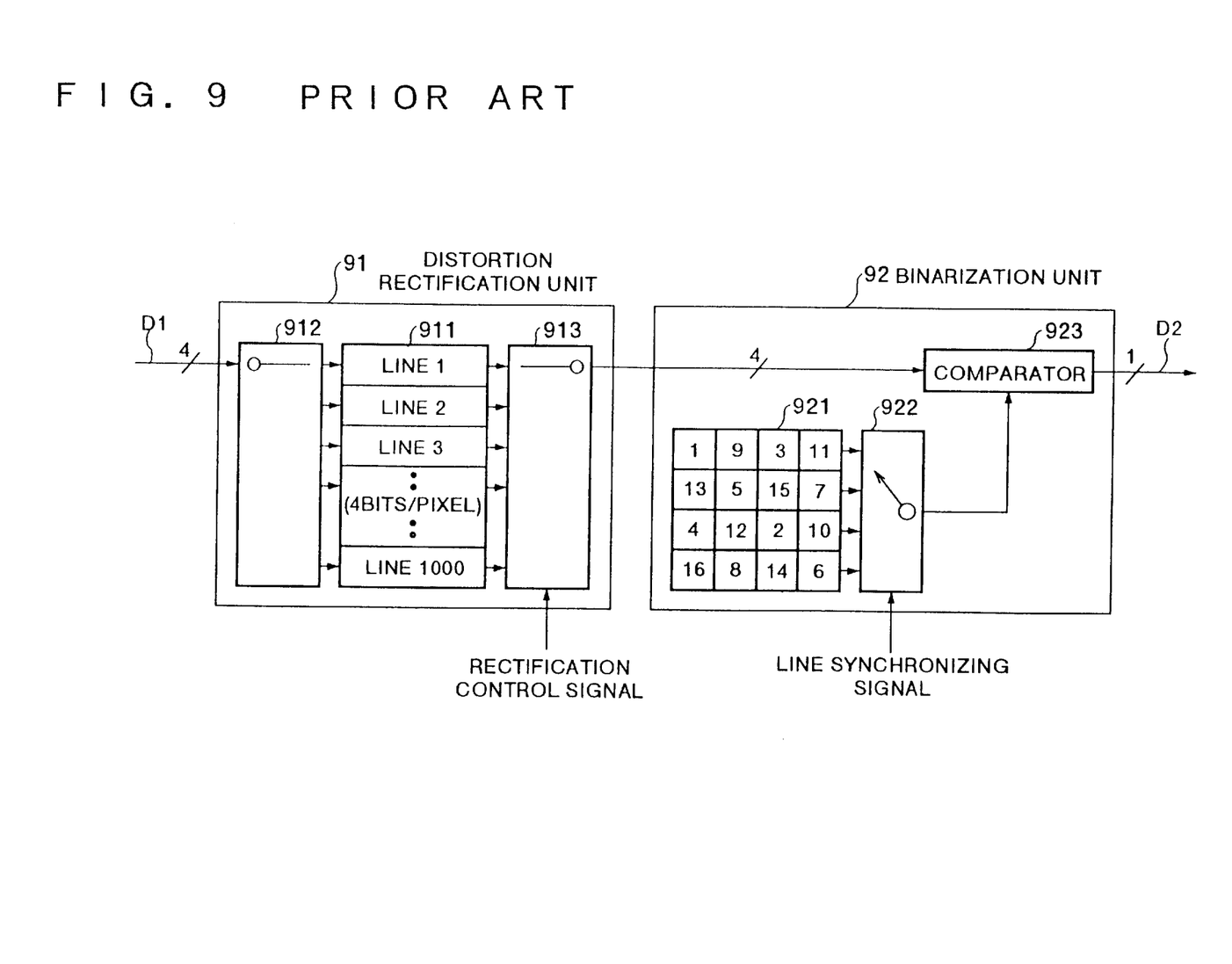
FIG. 9 is a view showing a data processing method of a conventional book scanner.

FIG. 9 is a view showing a data processing method of a conventional book scanner. Conventionally, a distortion rectification and binarization are executed in sequence. For example, 4-bit (16 gradations) read out data D1 are output from an analog/digital (A/D) converter (not shown) to a distortion rectification unit 91 in their scanned order (order of pixel arrangement). The distortion rectification unit 91 consists of a memory 911 for a prescribed capacity, a write-in control unit 912, and a readout control unit 913. The write-in control unit 912 writes the read out data D1 in the memory 911 in input order. In accordance with an instruction of a controller which is not shown, the read out control unit 913 reads out image data of each line from the memory 911 for the number of times corresponding to the duplicated number of each line (in case that the line is not duplicated, it is counted as "1"), and transmits it to a binarization unit 92. For instance, in case that one line for line j corresponds to 2 lines after the rectification (the duplicated number is "2"), it is read out two times. That is, the first time readout for line j is executed simultaneously with the write-in for line (J+1), and the second time readout for line j is executed simultaneously with the write-in for line (j+2). After that, line (j+1) is read out. A distortion caused by a curvature in the document surface is rectified by selecting the number of times of reading out for every line, as mentioned here.

The binarization unit 92 consists of a dither-matrix 921 of 4 lines and 4 rows, a selector 922, and a comparator 923. A selector 922 selects each line of the dither-matrix 921 one by one when a line synchronizing signal is input, and transmits the selected 4 threshold values to the comparator 923. The comparator 923, cyclically applying the 4 threshold values, converts the read out data D1 into binarized (1 bit) read out data D2.

In the above-mentioned distortion rectification, even if address spaces are cyclically utilized by simultaneously executing the write-in and readout in the memory 911, it needs at least a memory capacity for lines corresponding to the difference between lines before the rectification and lines after the rectification. For example, in case of reading out a bookform document that is A3 size in its opened state, and its height difference in the document surface is 50 mm in a resolution of 400 dpi, data on 1000 lines have to be temporarily memorized.

Conventionally, when the number of pixels in a line is 5000, and the number of gradations for reading out is 16 (4 bits), the memory 911 is needed to have a large capacity of 20 M bits (=4×5000×1000 bits). In case that the number of gradations is 256 (8 bits), a needed memory capacity is 40 M bits.

If the distortion rectification is executed after binarization, the memory capacity is able to be reduced. However, in such a case, notches in an outline of the image become conspicuous, so its picture quality is lowered.

SUMMARY OF THE INVENTION

The present invention is made to solve the above-mentioned problems, and an object of the present invention is to provide an image reading apparatus capable of rectifying an image distortion caused by a curvature of a document surface, and reducing a memory capacity needed for the distortion rectification without lowering the picture quality.

According to a feature aspect of the present invention, the image reading apparatus having a function for rectifying an image distortion caused by a curvature of the document surface, comprises a document reading device which scans a document surface, and outputs image data obtained thereby, in order by every one line, a height detector which detects a height of the document, and a data conversion device wherein an image distortion is rectified by duplicating the image data that is a line of pixels being output from the document reading device, in accordance with a varied amount of the heights detected by the height detector, and a data conversion that is an image processing procedure in which the number of bits for pixels is reduced, is executed for the rectified image data, and a memory which memorizes the image data which are processed in the data conversion device. The data conversion device is composed of data conversion elements whose number is the same as a maximum duplicated number "N" for the distortion rectification; besides, the image data are input to the data conversion elements whose number is the same as a duplicated number "n" for a line to be duplicated (n≦N).

According to a further feature aspect of the present invention, the image reading apparatus comprises a line output number changing device which determines how many lines are repeatedly output for one line image data which are output from the document reading device in accordance with the height of the document, a binarization processor which binarizes the one line image data which are output from the document reading device, with plural different threshold values, and outputs the binarized image data for lines whose number is determined by the line output number changing device, a memory to which the binarized image data which are output from the binarization processor, are output, and an image data reading out device which reads out the binarized data from the memory in their input order.

BRIEF DESCRIPTION OF THE DRAWINGS

FIGS. 3($a$) and ($b$) are principle views showing scanning of the book scanner.

FIGS. 4($a$) and ($b$) are explanatory views for a method to measure a curvature condition of a bookform document.

DETAILED DESCRIPTION OF THE PREFERRED EMBODIMENTS OF THE PRESENT INVENTION

Figure 1:
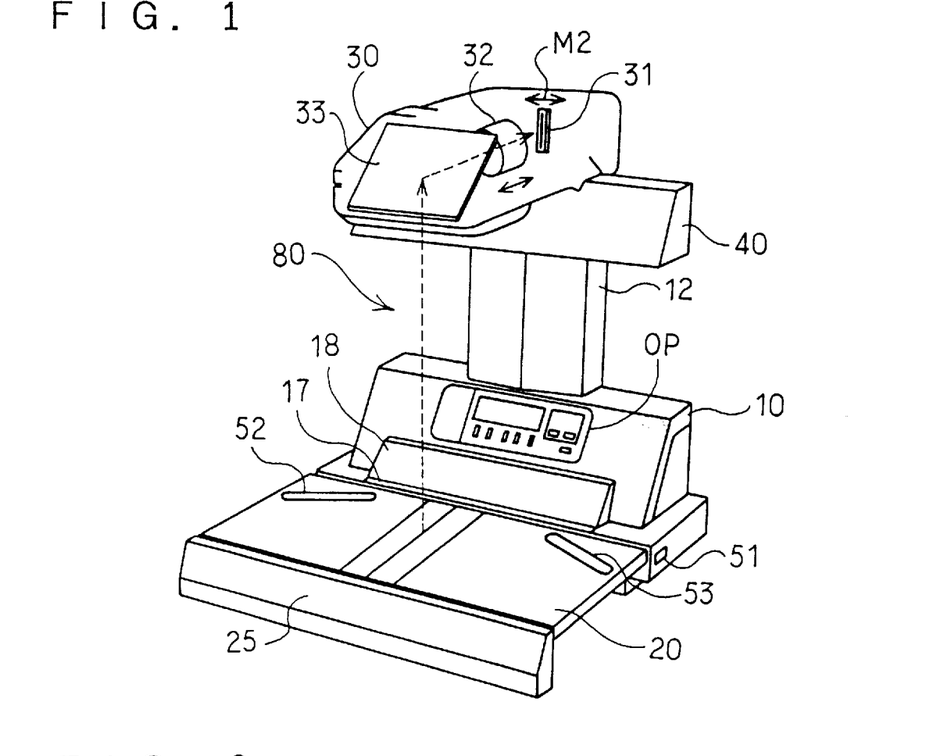
FIG. 1 is a perspective view of a book scanner (image reading apparatus) according to the present invention.
Figure 2:
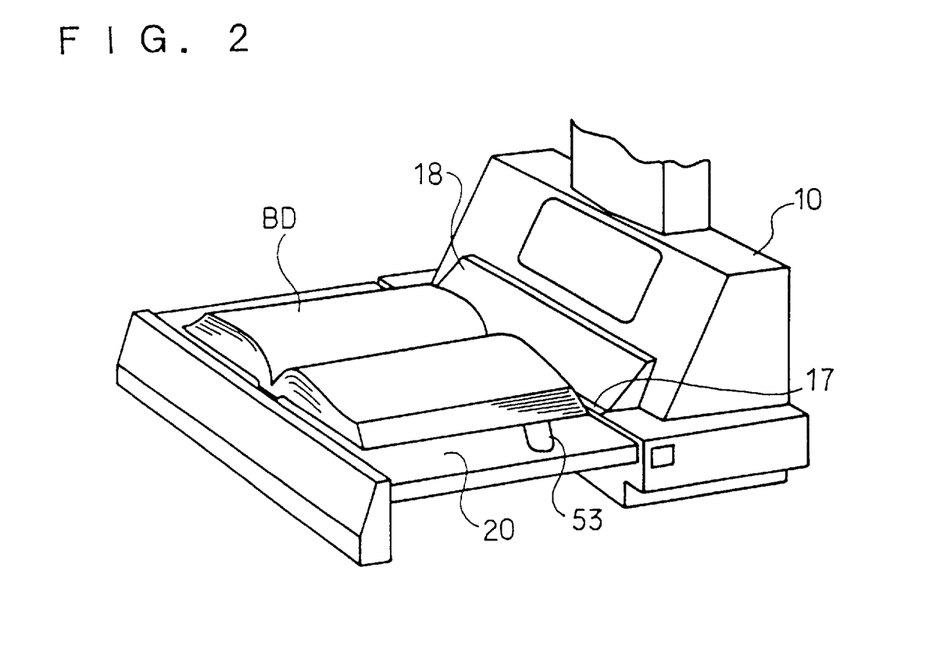
FIG. 2 is a view showing a usage of the book scanner.
Figure 3A:
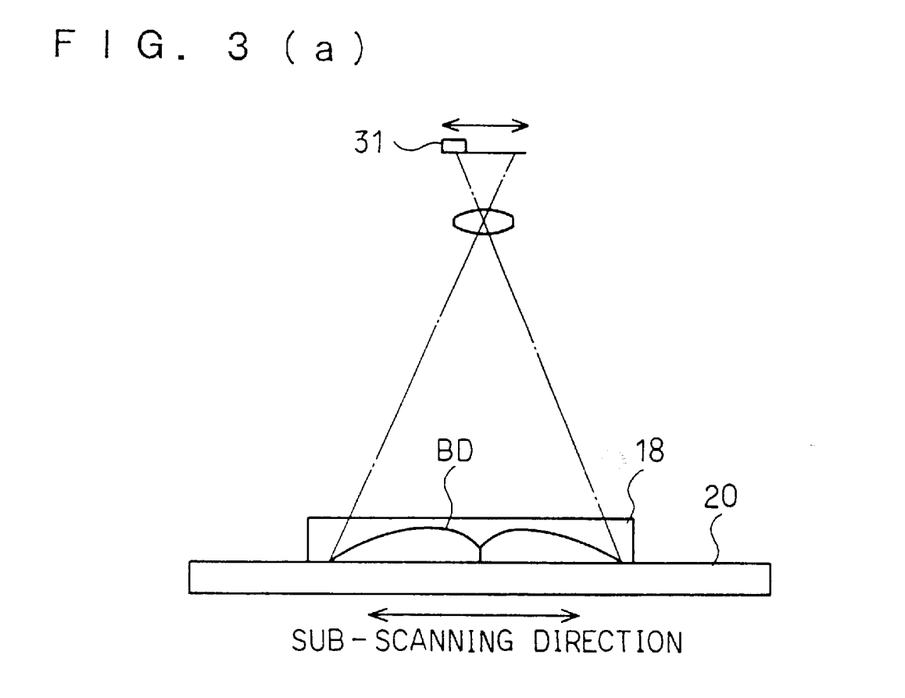
Figure 3B:
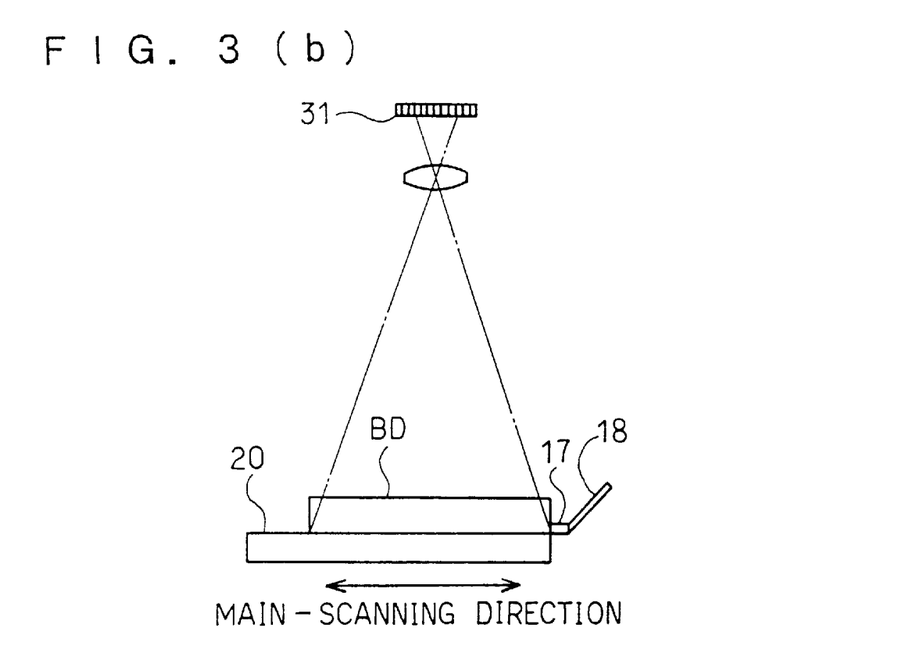

FIG. 1 is a perspective view of a book scanner 1 according to the present invention. FIG. 2 is a view showing a usage of the book scanner 1. FIG. 3($a$) and ($b$) are principle views of scanning of the book scanner 1. The book scanner 1 is an image reading apparatus for reading out a bookform document which is opened, and it comprises a body housing 10 which contains a power circuit, a dark-colored document table 20 on which the document is placed face up, a pickup unit 30 which converts an image of the document into electric signals, and a lamp unit 40 which illuminates the document on the document table 20. The document table 20 is arranged in front of the body housing 10. The pickup unit 30 is disposed on a position for reading an object on the document table 20 from above, and supported on one side of it by a support column 12 which extends upwards from the top surface of the body housing 10. The lamp unit 40 is fixed on the support column 12 at a the bottom surface of the pickup unit 30. A space 80 between the document table 20 and the pickup unit 30 is freely opened in a space outside of the apparatus, and has an enough space for setting the bookform document. A distance from the top surface of the document table 20 to the bottom surface of the pickup unit 30 is 30 cm or more.

An operation panel OP having an liquid crystal display is disposed on a front upper end side of the body housing 10, and a projection panel 18 for detecting a height of the document surface is fixed on a lower end side of the body housing 10. A front surface of the projection panel 18 is a glossed plane, and arranged at an angle of 45 degrees to a top surface of the document table 20. An image of an end surface of the bookform document is projected on the projection panel 18; then, the projection panel 18 is read together with the image of the document. A dark-colored plane surface 17 having a fixed width, exists between a lower end edge of the projection panel 18 and the document table 20.

A main switch 51 is arranged on the right side of the body housing 10. Start keys 52 and 53 with which an user commands to start reading out, are provided on both sides of the document table 20. In addition, an arm rest 25 is provided on a front side of the document table 20.

In FIG. 1, the pickup unit 30 comprises a line sensor 31 composed of a charge coupled device (CCD) array, an image forming lens 32 and a mirror 33. The image of the document is projected on a photoreceptor surface of the line sensor 31 by the mirror 33 and image forming lens 32. The image forming lens 32 is arranged so as to be movable in forward and backward, and positioned by an auto focus (AF) mechanism which is not shown. The line sensor 31 is arranged on a movable body of a scanning mechanism which is not shown, and horizontally moves along the direction (sub-scanning direction) M2 with maintaining the arrangement direction of CCD elements in a vertical direction. It means that a two-dimensional image is picked up by this horizontal movement. That is, in the book scanner 1, an image pickup surface in the two-dimension is formed by a movement of the line sensor 31. In case of employing an area sensor instead of the line sensor 31, its photoreceptor surface functions as the image pickup surface. A main-scanning direction for the image is forward and backward on the document table 20, and upward and downward on the image pickup surface.

When using the book scanner 1, an user opens and places a bookform document BD with face up on the document table 20 as shown in FIG. 2. Then, the bookform document BD is positioned in a lateral direction by fitting a border between a right page and a left page on a center line of the document table 20, and positioned in a longitudinal direction by pressing the bookform document BD on a front end edge of the plane surface 17. A border between the plane surface 17 and the document table 20 is a reference line for setting the document. Further, the document table 20 is supported so as to move downward according to a weight of the document by a spring member. Thus, a distance between a document surface and the mirror 33 is constantly kept within a predetermined range regardless of thickness of the bookform document BD.

A book scanner 1 executes both of a pre-scanning and a main-scanning for the document. A surface of the bookform document BD is curved, unlike a sheet document, so that there is a necessity to adjust focus of the pick up image in accordance with a curvature condition of the document surface, and there is also a necessity for a process to rectify a distortion of the image and to correct a difference in brightness. Therefore, in the pre-scanning, the curvature condition is detected, and based on its detected result, an operation setting for the main-scanning is executed. An image is output to an external device at the main-scanning.

There are two types of readout modes: one is a mode to read out both pages of right and left (sheet document mode) at the same time, another is a mode to separately read each page of right and left (bookform document mode). In both modes, both of the pre-scanning and main-scanning are executed for each page.

Figure 4:
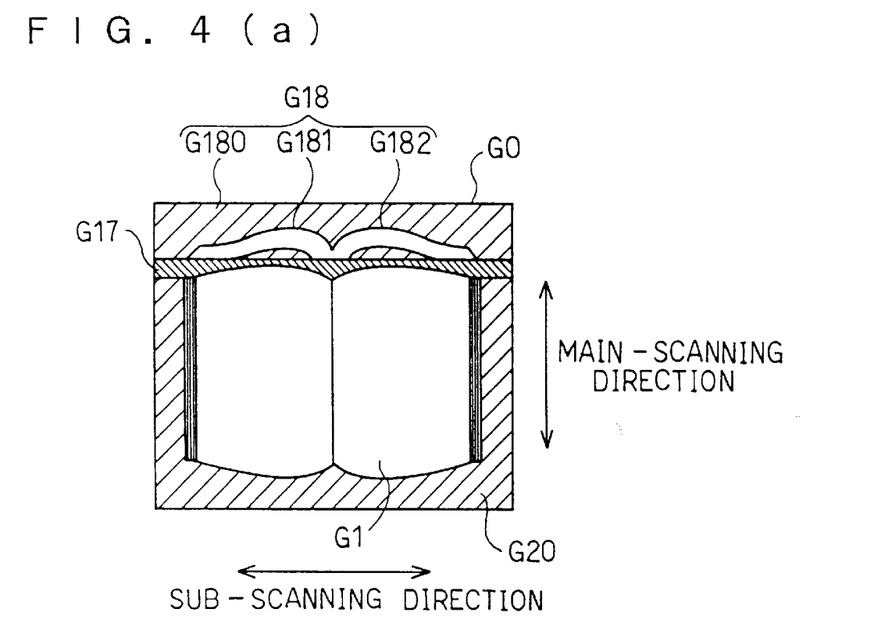

FIGS. 4(a) and 4(b) show explanatory views for a method to measure the curvature condition of the bookform document. A broken line shows a line which is picked out. A total readout image G0 is composed of a readout image G1 of the bookform document BD, a readout image G20 of the document table 20, a readout image G17 of the plane surface 17 and a readout image G18 of the projection panel 18. Images G181 and G182 of the readout image G18 show a shape of an upper end surface (so-called "head" in books) of the bookform document BD which is set on the document table 20. Further, a part except for the images G181 and G182 is a background image which is projected on the projection panel 18.

As mentioned previously, the document table 20 and plane surface 17 are colored darkly, so the readout images G20 and G17, corresponding to them, are also darker than other images. Therefore, the readout image G1, images G181 and G182 are extracted by distinguishing image values in the total readout image G0. Describing concretely, brightness (pixel value) is examined in every line in order from a leading pixel in the main-scanning direction, so "n1" and "n2", which are a leading and a trailing pixel position (pixel number) among pixel positions whose brightness exceeds a first threshold value th1, are detected, and "n3" and "n4", which are a first and a trailing pixel position among pixel positions whose brightness exceeds a second threshold value th2 (th2>th1), are detected. The number of pixels which exist between the pixel position n1 and a known pixel position n5 corresponding to a front edge of the projection panel 18, corresponds to the document height in the above-mentioned line, and the number of pixels which exist between the pixel position n3 and pixel position n4, corresponds to the document size in the main-scanning direction. The actual height and size of the document are calculated by dividing the number of pixels by a resolution for picking up. Curvature conditions of the document surface are specified by a set of data which indicates the document height in each line. Further, each position of the first line and trailing line in which the pixel positions, n3 and n4 are detected, corresponds to each position of both ends of the document in the sub-scanning direction.

In the total readout image G0, both edges of upper end and lower end of the readout image G1 are curved because the document height is not fixed. Therefore, a subject close to the image pickup surface are picked up in larger scale than a subject apart therefrom. In the main-scanning, based on the document height data which are obtained at the pre-scanning, an image-processing (rectification of an image distortion) which rectifies the curved readout image G1 into an image in case that the height of the document surface is supposed to be fixed. Describing concretely, as for the main-scanning direction, a plane surface in a position of a certain distance (for example, 5 cm) above the document table 20 is supposed to be a reference surface, and the readout image G1 is magnified variably in accordance with a height difference between the reference surface and the document surface in each sampling position. As for the sub-scanning direction, the readout image G1 is magnified variably in every minimal section in accordance with a varied amount of the document height (an inclination of the document surface). In detail, the curved images are enlarged into the plane image as described in FIG. 8 by duplicating lines in accordance with ratios of length of the document along surface to a projected length to the document surface. In this embodiment, the maximum duplicated number "N" for one line is "2," so a line before the rectification, does not correspond to 3 or more corrected lines after the rectification.

Figure 5:
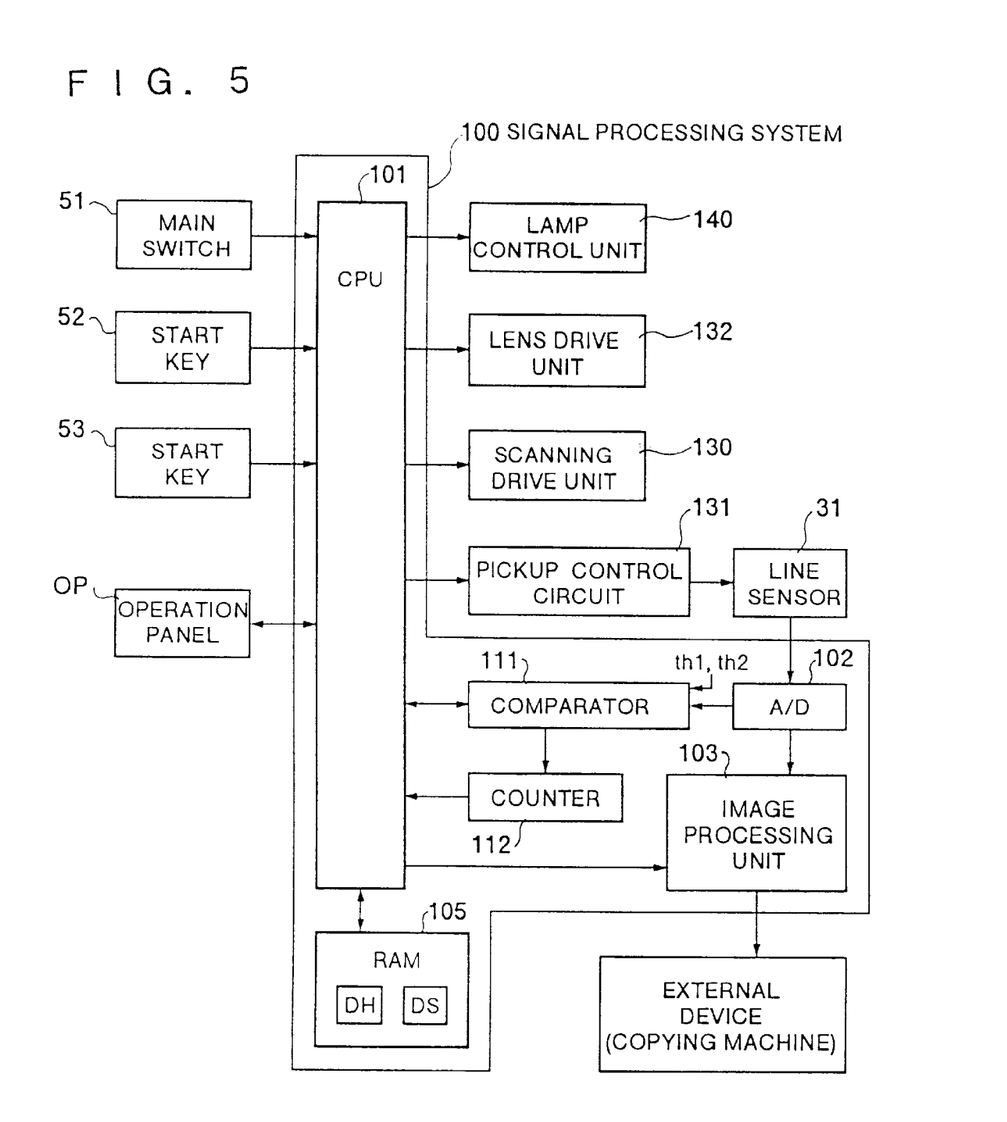
FIG. 5 is a block diagram of a signal processing system of the book scanner.

FIG. 5 is a block diagram of a signal processing system 100 in the book scanner 1. The signal processing system 100 comprises a central processing unit (CPU) 101, an analog/digital (A/D) converter 102, an image processing unit 103, a random access memory (RAM) 105, a comparator 111 and a counter 112.

In the pre-scanning, an output from the line sensor 31 is converted into 4-bit image data by the A/D converter 102, and input to the comparator 111 in order of an arrangement of pixels. The comparator 111 compares the input values of the image data with the threshold values th1 and th2, and transmits the compared result to the CPU 101 and the counter 112. The counter 112 counts the number of pixels whose values of the data exceed the threshold value th1. Thereby the document height is measured. The CPU 101 takes in counted values in the counter 112, and forms document height data DH which indicates the curvature condition of the document surface. Moreover, it also takes in the pixel positions n3 and n4 which are detected by the comparator 111, and forms document size data DS which indicates the document size in the view of a plane surface. The document height data DH and document size data DS are temporarily stored in the RAM 105. After finishing the pre-scanning, based on the document height data DH and document size data DS, the CPU forms data for rectifying image distortions and illuminance nonuniformity; these are preparations for the main-scanning. Then, it calculates length for one page of the document surface in the sub-scanning direction, and sets up an output image range (readable range).

In the main-scanning, an output from the line sensor 31 is converted into 4-bit image data by the A/D converter 102, and input to the image processing unit 103. The image processing unit 103 executes a procedure of rectifying the illuminance nonuniformity in the document surface, a modulation transfer function (MTF) correction for improving picture quality, a procedure of variable magnification including a rectification of image distortions caused by a curvature of the document surface, and procedures such as a binarization for reproducing medium tones, a correction of density, and a image processing of blanking the outside of the output image. The image data which are processed by the procedures as mentioned above, are output to an external device (e.g. a digital copying machine).

The CPU 101 also controls drive systems including a pickup control circuit 131, a scanning drive unit 130, a lens drive unit 132 and a lamp control unit 140. The operation panel OP and various switches are connected to the CPU 101. The RAM 105 is employed for temporarily memorizing various data concerning controlling procedures.

Figure 6:
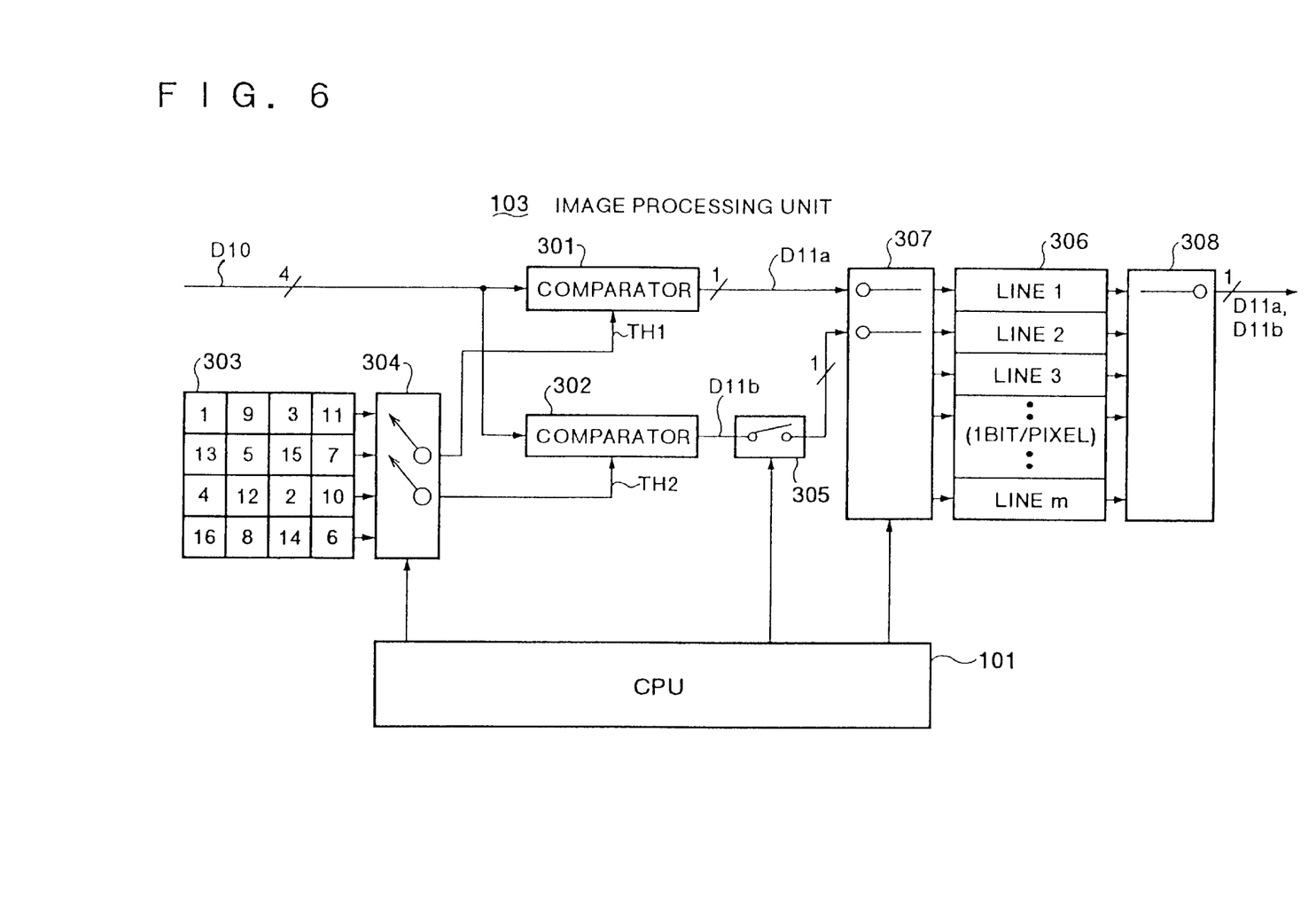
FIG. 6 is a block diagram of a main part of a image processing unit.

FIG. 6 is a block diagram of a main part of the image processing unit 103, which shows a structure of a means to achieve a data processing which is particular to the present invention. The image processing unit 103 comprises two comparators 301 and 302 whose number is the same number as the maximum duplicated number "N", a dither-matrix 303 of 4 lines and 4 rows for the binarization, a selector 304 for changing over threshold values for the binarization, a gate circuit 305, a buffer memory 306, a write-in control unit 307 and a readout control unit 308. The comparators 301 and 302 are structural elements corresponding to data conversion elements in the present invention. The buffer memory 306 consists of m (e.g. 1000) line memory banks, and has a capacity to memorize binarization data for m lines. FIG. 8 shows an explanatory example in which the number of lines to be duplicated for the distortion rectification, is "5" (corresponding to white circles), so in this case, m is to be 5.

Four-bit image data D10 which are formed by the A/D converter 102, are input in both of the comparators 301 and 302. Each of the comparators 301 and 302 compares threshold value data TH1 and TH2 from the selector 304 with image data D10, and outputs image data D11a and D11b which the image data D10 are binarized into. Then, the selector 304 selects different two lines out of the dither-matrix 303 in accordance with an instruction of the CPU 101. After that, it provides the comparator 301 with 4 threshold values belonging to one of these selected lines, and provides the comparator 302 with 4 threshold values belonging to the other. When binarizing a line, 4 threshold values are applied cyclically one by one to every pixel in each of the comparators 301 and 302,.

The binarized image data D11a output from the comparator 301, are always transmitted to the write-in control unit 307. On the other, the binarized image data D11b output from the comparator 302, are transmitted to the write-in control unit 307 only in case of duplicating the line. The gate circuit 305 passes the image data D11b through, or shuts it off in accordance with an instruction of the CPU 101. Moreover, although the gate circuit 305 is arranged at a position on or after the binarization by use of the comparator 302, a circuit which shuts off both of D10 and TH2 that are input to the comparator 302, may be arranged at a position before the comparator 302.

By means of operations of the above-mentioned structural elements, both of the distortion rectification and binarization are sequentially executed. For example, supposing line 1 is duplicated, the comparator 301 is given threshold values (1, 9, 3, 11 in FIG. 6) in the first line of the dither matrix 303, while the comparator 302 is given threshold values (13, 5, 15, 7 in FIG. 6) in the second line of the same. Succeedingly, the line 2 is duplicated therewith, the comparator 301 is given threshold values (4, 12, 2, 10 in FIG. 6) in the third line, while the comparator 302 is given threshold values (16, 8, 14, 6 in FIG. 6) in the fourth line. Even in case that the line 1 is not duplicated, the comparator 301 is also given the threshold values in the first line, while the comparator 302 is also given the threshold values in the second line. However, in this case, the gate circuit 305 is in a state to open, so the operation of the comparator 302 is shut off; therefore, when processing the following line 2, the comparator 301 is given the threshold values in the second line, and the comparator 302 is given the threshold values in the third line. That is, the CPU 101 sets up an output of the selector 304 so as to correctly binarize the image whose distortion has been corrected.

The image data D11a and D11b which are formed as described above, are temporarily stored in the buffer memory 306 in order to correct a difference between the image processing speed and the output speed. It is because the output is executed in order of lines. The write-in and readout in the buffer memory 306 are executed simultaneously, so the number "m" of the line memory banks in the buffer memory 306 is to be the value corresponding to the difference between the number of lines before the distortion rectification and the number of lines after the rectification (e.g. 1000). Since the image data D11a and D11b are 1 bit, a needed memory capacity becomes one fourth of that of the prior art in which the distortion rectification is executed before binarization. In case that D10 is 8 bits, it becomes one eighth.

The write-in control unit 307 writes in the image data D11a and D11b in order by every one line until line m in the line buffer 306, and the written image data D11a and D11b are read out in order by the readout control unit 308. When the write-in is completed until line m, the write-in control unit 307 repeatedly writes in from an address (line 1 in the line buffer) that is already read out.

The write-in control unit 307 writes the image data D11a corresponding to the image data D10 of line i in the buffer memory 306 as data on line (i+α) after the rectification. Moreover, when the image data D11b corresponding to the image data D10 of the line i are input, the image data D11b are written in the buffer memory 306 as data on line (i+α+1) after the rectification. Said "α" indicates the total number of lines which have been duplicated theretofore.

The readout control unit 308 outputs the image data D11a and D11b from the buffer memory 308 to a following column in order of the read out lines in the rectified image (enlarged image).

Figure 7:
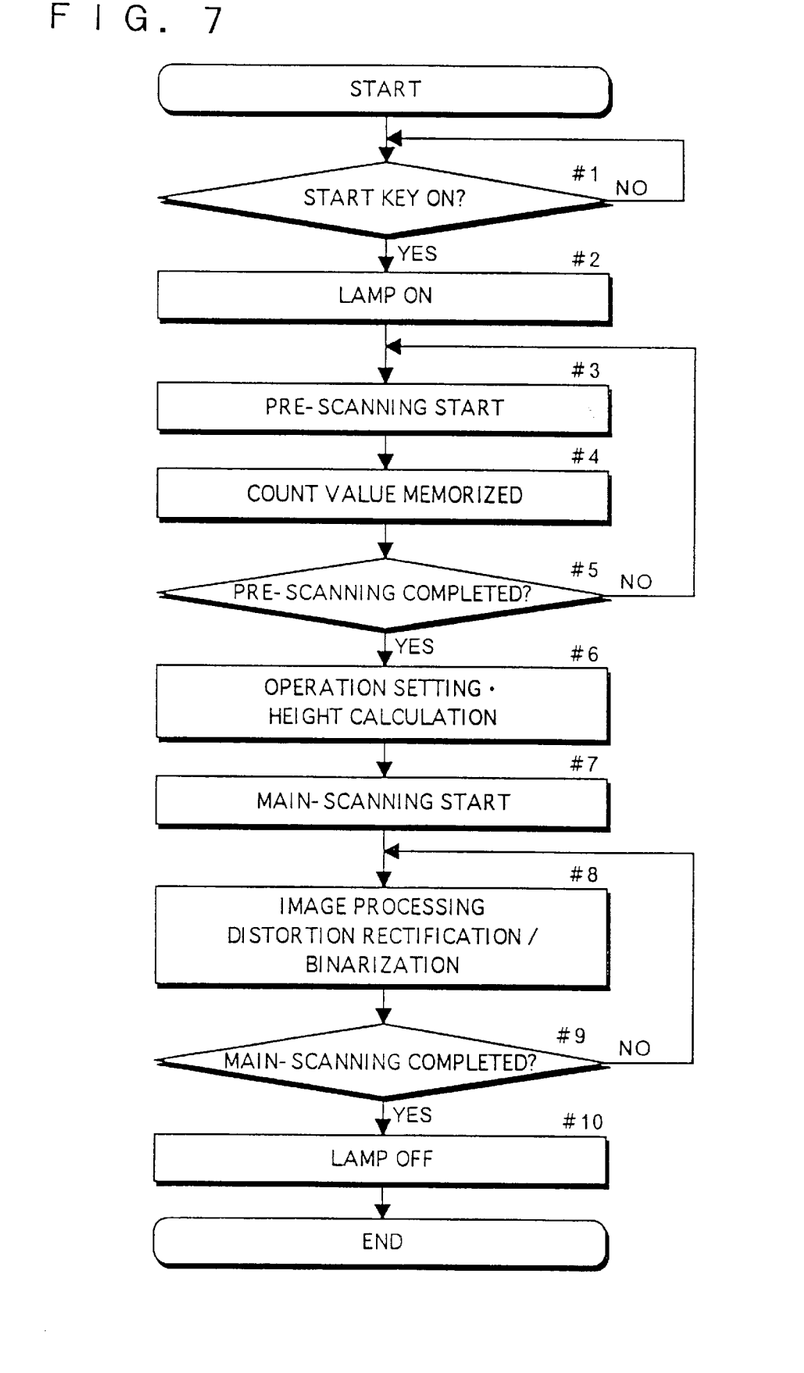
FIG. 7 is a main flow chart of a process executed by a CPU.

Next, operations of the book scanner 1 is explained referring to a flow chart. FIG. 7 is a main flow chart of a process executed by the CPU 101. After one of twin start switches 52 and 53 is ON, the CPU 101 instructs the lamp control unit 140 to light the lamp for illuminating the document, and instructs the scanning drive unit 132 and the pickup control unit 131 to start the pre-scanning (from #1 to #3). During the pre-scanning, a document height and a document size are calculated (#4) by the comparator 111 and the counter 112 as mentioned previously.

After the pre-scanning is completed (#5), the CPU 101 forms the document height data DH which are basic data for all kinds of rectification procedures, and executes the operation setting corresponding to each mode (#6); these are preparations for the main-scanning. Then, it instructs the scanning drive unit 132 and the pickup control unit 131 to start the main-scanning (#7). During the main-scanning, adjusting its timing to the timing when lines are read out in order, it instructs the image processing unit 103 to rectify the distortion in accordance with the document height data DH (#8). After the main-scanning is completed, it instructs to put off the lamp, and completes a series of processing (#9, 10).

Although, in the above-mentioned embodiment, the maximum duplicated number for the distortion rectification is "2", it is able to be "3" or more. The number of the comparators 301 and 302 for the binarization should be at least "N." However, there is no need to input the image data D10 for every line to N comparators. If the image data D10 are input in the n comparators whose number is the same as the duplicated number "n" of the line to be duplicated (n≦N) (if N is 2, n is to be 1 or 2), both of the distortion rectification and binarization are executed sequentially in the image processing unit 103. FIG. 8 shows an explanatory example in case that N is 2; in this case, each of one line is duplicated (shown by white circles) as to 5 lines. A method for binarization is not restricted to the dither method. Further, in a process in which the bit number of the image data D10 is reduced, the present invention is also able to be applied to a case in which the image processing but the binarization (e.g. color conversion, etc.,) is executed.

What is claimed is:

1. An image reading apparatus having a function for rectifying an image distortion caused by a curvature of a document surface, comprising:

a document reading device which scans a document, and outputs document image data which are obtained thereby, in order by every one line;

a document height detector which detects a height of the document surface;

a data conversion device which rectifies an image distortion by duplicating the image data that is a line of pixels being output from the document reading device, in accordance with a varied amount of the heights detected by the height detector, and executes a data conversion that is an image processing procedure for the rectified image data, in which the number of bits for pixels is reduced; and, a memory which memorizes image data which are processed in the data conversion device.

2. The image reading apparatus as claimed in claim 1, wherein the data conversion device includes data conversion elements whose number is the same as a maximum duplicated number "N" for the distortion rectification, and the image data are input to the data conversion elements whose number is the same as a duplicated number "n" (n≦N) for a line to be duplicated; and, the memory memorized n-line image data which are processed in the data conversion device.

3. The image reading apparatus as claimed in claim 2, wherein the data conversion device executes both of the distortion rectification and the data conversion.

4. The image reading apparatus as claimed in claim 1 or claim 2, wherein the data conversion is a binarization process.

5. The image reading apparatus as claimed in claim 1 or claim 2, wherein the memory is a buffer memory having a line memory bank, and has lines whose number corresponds to a difference between number of lines before the distortion rectification and number of lines after the distortion rectification.

6. The image reading apparatus as claimed in claim 2, wherein the data conversion device, includes comparators which compare the output image data with a prescribed threshold value, and output binarized data thereby, whose number is the same as the maximum duplicated number "N"; and, a selector which selects the threshold value and provides the selected threshold value to the comparators.

7. The image reading apparatus as claimed in claim 1 or claim 2, wherein the document reading device executes a pre-scanning and a main-scanning, and the height detector detects the height of the document surface by image data obtained in the pre-scanning.

8. An image reading apparatus having a function for rectifying an image distortion caused by a curvature of a document surface, comprising:

a document reading device which scans a document, and outputs document image data which have a plurality of bits for each pixel in order by every one line;

a document height detector which detects a height of the document surface;

a controller which determines how many lines are repeatedly output for the one line image data which are output from the document reading device in accordance with the height of the document surface;

a binarization processor which binarizes the one line image data which are output from the document reading device, with a plurality of different threshold values, and outputs the binarized image data for lines whose number is determined by the controller wherein said binarized image data have one bit for each pixel;

a memory to which the binarized image data which are output form the binarization processor, are input; and, an image data reading out device which reads out the binarized data from the memory in their input order.

9. The image reading apparatus as claimed in claim 8, wherein the document reading device reads the document by moving a line sensor relatively to the document.

10. The image reading apparatus as claimed in claim 9, wherein the line sensor is a charge coupled device (CCD) sensor.

11. The image reading apparatus as claimed in claim 8, further comprising a mirror which is arranged so as to have the document reading device read an end surface of the document, and wherein the height detector detects the document height based on the image data which is output from the document reading device in correspondence to the end surface of the document.

12. The image reading apparatus as claimed in claim 8, wherein the binarization processor includes a dither-matrix, and binarizes the one-line image data which are input from the document reading device, with threshold values belonging to a plurality of different lines of the dither-matrix.

13. The image reading apparatus as claimed in claim 12, wherein the plurality of different lines of the dither-matrix are adjoining lines.

14. A data processing method for rectifying an image distortion caused by a curvature of a document surface, comprising:

a step of scanning a document, and outputting document image data which are obtained thereby, in order by every one line;

a step of detecting a height of the document surface;

a step of rectifying an image distortion by duplicating the image data that is a line of pixels being output from the document reading device, in accordance with a varied amount of the heights detected by the height detector, and executing a data conversion that is an image processing procedure for the rectified image data, in which the number of bits for pixels is reduced, by selecting n data conversion elements form N data conversion elements in accordance with the varied amount of the heights and inputting the image data to the n data conversion elements wherein N is a maximum duplicated number for the distortion rectification and n is a duplicated number that is smaller than N; and, a step of memorizing n-line image data which are processed in the data conversion step.

15. The data processing method as claimed in claim 14, wherein both of the distortion rectification and the data conversion are simultaneously executed in the rectifying step.

* * * * *